3,295,957
PRODUCTION OF HIGH STRENGTH BRIQUETTES FROM SOLID-STATE-REDUCED IRON ORES
Peter Robertson, Lakewood, Ohio, assignor to Republic Steel Corporation, Cleveland, Ohio, a corporation of New Jersey
Filed Apr. 5, 1965, Ser. No. 445,502
4 Claims. (Cl. 75—33)

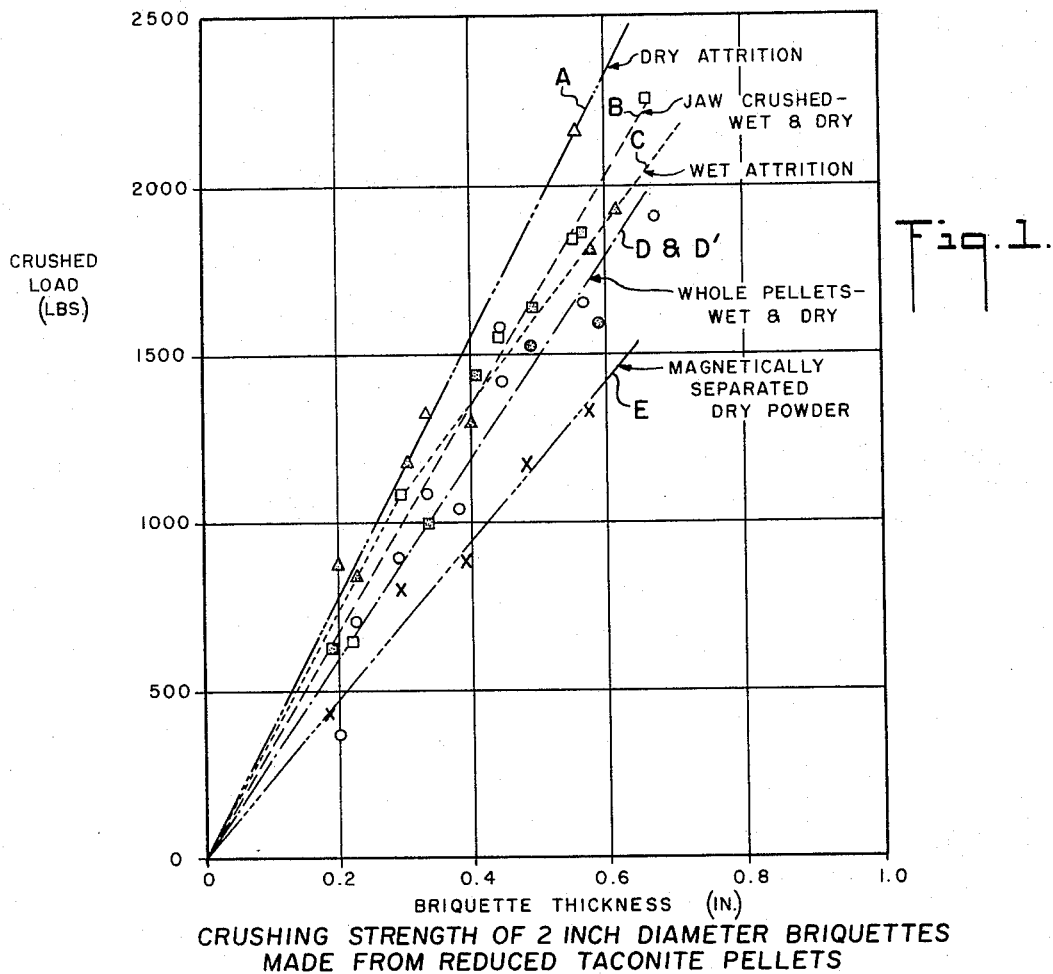
CRUSHING STRENGTH OF 2 INCH DIAMETER BRIQUETTES MADE FROM REDUCED TACONITE PELLETS
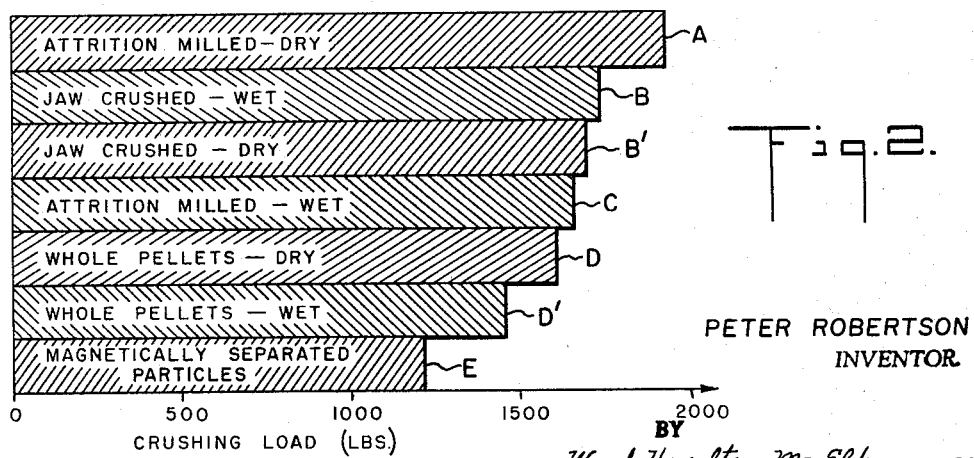
RELATIVE CRUSHING STRENGTHS OF REDUCED TACONITE
PETER ROBERTSON
INVENTOR.
BY Ward, Haselton, McElhannon, Orme, Brooks + Fitzpatrick
ATTORNEYS – # United States Patent Office 3,295,957
Patented Jan. 3, 1967

This application is a continuation-in-part of my co-pending application Serial No. 262,439, filed March 4, 1963, now abandoned which is in turn a continuation-in-part of my earlier filed application Serial No. 77,649, filed December 22, 1960 (now abandoned).

This invention pertains to the production of high strength briquettes from solid-state-reduced iron ores containing substantial amounts of gangue and other impurities, and without separation thereof from the metallic iron values.

Metallic iron as produced by solid state reduction of iron oxide with gaseous or solid carbonaceous reductants, provides a suitable feed material for increasing the output of blast furnaces provided the iron fines so obtained are formed into briquettes of a suitable size for charging therein. Such briquettes, however, must be of sufficient strength to withstand excessive breakage in handling and shipping.

Past experience has been to the effect that only iron powders in a substantially pure state have sufficient coherence when compacted under pressure to form briquettes of the requisite strength, to produce which the solid-state-reduced product of virgin or beneficiated iron ore is subjected to concentration of the metallic iron values by appropriate separating sequences, including screening, grinding and magnetic separation, for removal of gangue and other impurities, which is an expensive procedure and such as to deter the use of metallic iron so obtained as a blast furnace feed.

Now I have discovered quite surprisingly in accordance with the present invention that it is not necessary to subject the reduced ore product to such concentration of the metallic iron values for producing briquettes of high strength, provided the reduced product does not contain more than about 20% by weight of gangue and other impurities including unreduced iron oxide values. I have found quite to the contrary that if the reduced ore product contains only about 5–20% of such impurities, that briquettes of substantially higher strength are obtained by briquetting the reduced ore product without separation of the gangue and such other impurities than is obtained by first separating and concentrating the metallic iron values and thereupon briquetting. My investigations have shown as substantiated by the test results present below, that the briquetted strengths obtained without separation of such impurities are actually from about 30 to 65% higher than those obtained from the pure metallic iron concentrates.

I find this to be particularly so if the iron ore prior to reduction is formed into pellets, preferably of from about ¼ to ¾ inch in diameter, and either indurated by heating prior to reduction or indurated in process of reduction carried out at temperature just below the fusion or sintering point of the material. It was not in my opinion to be anticipated that such heat hardened or indurated reduced ore pellets could be bonded into strong briquettes by compacting under pressure in view of their smooth and hardened surfaces, but I found this nevertheless to be the fact, provided the gangue and other impurities therein did not exceed about 20% by weight.

Without being bound to any particular theory, it is my belief that in such reduced pellets, good contact between the reduced, metallic iron particles is obtained on compacting, and to a greater extent when the pellets are not previously ground to a fine powder. It is my belief that grinding or comminuting the reduced pellets to a fine particle size results in reduced contact between the metallic iron particles on compacting. Therefore, the contact between the metallic iron is best obtained by avoiding excessive reduction of the pellets to very fine particle sizes, and excellent briquetting properties are thereby obtained. I do find, however, that the strength of the resulting briquettes is enhanced by shredding, coarse crushing, or by other methods of dry attrition grinding the pellets to particle sizes within the ranges set forth below, prior to briquetting.

Thus my invention consists essentially in the solid state reduction of oxidic iron ores containing substantial amounts of gangue to produce a reduced ore product containing gangue and other impurities including iron oxide, in amount not exceeding about 20% and generally in amount of about 5–20%, and briquetting such product without separation of the gangue and other impurities from the metallic iron values.

I prefer to continue the reduction until at least 80% of the iron values are metallized. I also prefer to employ as the reductant, a solid carbonaceous material such as coke, coke breeze, anthracite coal or the like, and to carry out the reduction in an inclined rotary kiln through which these materials together with lime if required, are continuously fed in the presence of a counterflow of hot combustible gases and with the introduction of free oxygen containing gas, such as air, at spaced points along the kiln to provide the necessary combustion for heat of reduction, and in the manner described in U.S. Patent 2,829,042 to O. Moklebust. I also prefer as above stated that the ore be pelletized and the pellets be indurated by heating at about 2200–2400° F. prior to feeding into the kiln, although the pellets may be fed "green" into the kiln and indurated therein while being reduced, the kiln temperature in the reduction zone being maintained at about 1900–2000° F., or just below the sintering point as described in said Moklebust patent.

My invention embodies a number of advantages over prior art techniques of which the following are most significant. Since with my invention there is no separation of the gangue and other impurities from the metallic iron values of the reduced ore product prior to briquetting, the expenses of grinding and magnetic and other separating sequences for recovering and concentrating the metallic iron values is eliminated.

Whereas in accordance with prior art techniques, reduction is continued to the point of maximum metallization of the iron values, in order to provide the maximum metallic iron recovery after concentration for briquetting since the residue is lost, in my process all the iron values including unreduced iron oxide, are retained and subsequently utilized, since there is no separation prior to briquetting. Also with my invention it is not necessary for this reason to carry reduction of the iron oxides substantially to completion as heretofore, since they are retained in the briquettes and utilized as a source of additional iron in subsequent refining steps.

Also the higher tolerance of iron oxide in the briquetting compositions of my invention permits the use of less of the solid carbonaceous reducing medium, thus reducing the amount of combined carbon in the metallized iron. This has the decided advantage over prior practices wherein a large excess of carbon is required for maximum metallization with resultant high combined carbon content in the metallized iron. This high content of combined carbon which is usually in excess of 0.1–0.2%, results on quenching from the reduction temperature in the formation of martensite in the metallic iron, which prevents effective bonding between these particles on compacting, since martensite is of a hard and brittle structure. Tests have shown that briquettes so formed are quite weak and easily broken up. To prevent this, special cooling techniques are required to assure cooling at a sufficiently slow rate to prevent the formation of martensite and to impart instead to the metallic iron particles, a relatively soft and malleable pearlitic or spheroidal structure which improves the bonding action.

With my invention these special cooling precautions are not in general required, because maximum metallization of the ore is not required. Hence, the solid carbonaceous addition may be made sufficiently low to avoid the formation of martensite in the iron particles on rapid cooling as by water quenching from the reduction temperature. Thus in such addition the carbon may be about equal to or even less than the stoichiometric amount required for complete metallization of the iron values, since an appreciable amount of unreduced iron oxide in the reduced ore product is not objectionable.

This also has the further advantage that the reduced ore product contains little or no solid carbonaceous reductant to be separated out and recycled. And where such is present it may be easily separated by employing a carbonaceous reductant of finer particle size than those of the ore particles or pellets being reduced, by simply passing the kiln output over a vibrating screen of a mesh to pass or screen out the reductant particles while retaining thereon the ore particles or pellets.

The processes and equipment used in preparing the pellets used in the practice of this invention, and also for effecting the reduction of iron oxide to metallic iron are those normally used for such purposes.

As used herein, the term "pellets" is employed in a generic sense, to include also balls, peach stones, etc. Generally the pellets have their smallest dimension advantageously no less than ⅛ inch and preferably at least ¼ inch. While the maximum dimension can be as high as 1 inch or even more, it is generally preferable to have the largest dimension no greater than about ¾ inch. With regard to partially crushed pellets, where such crushing is employed prior to briquetting, it is generally desirable that at least about 75 percent, preferably at least about 80 percent of the material be of a size greater than would pass through a 40 mesh screen, and preferably that at least 50 percent, advantageously at least 65 percent of said material be larger than a size which would pass through a 20 mesh screen.

The various methods known in the industry for making pellets, including balls and peach seeds, can be used in producing the pellets to be reduced and subsequently treated in accordance with the practice of this invention. For example, in accordance with present general practices, a balling drum can be used or a slanted, rotating disc can be employed. Moreover, the pressing technique used in making peach seeds also is satisfactory. In preparing the pellets, the iron ore advantageously is crushed and ground to a mesh size having 90 percent of the particles of a size which will pass through a 300 mesh screen. The "green" pellets as thus produced may be hardened or indurated by heating preferably at about 2200–2400° F., or the "green" pellets may be fed directly into the rotary reduction kiln and indurated therein during the process of ore reduction.

While other types of ore can be used in varying concentrations provided the desired iron content is attained in the reduced pellets, a particularly satisfactory ore composition is a concentrated taconite ore containing about 65 percent iron by weight of the total, the remainder being principally silicious gangue. Preferably about 0.7 percent and not more than about 2% bentonite can be added to the ore composition to facilitate the balling or pelletizing. While other binders, such as starch, clay, lime, calcium or magnesium chloride, etc., can be used, bentonite is preferred. It is generally desirable that the reduced ore pellets contain no less than about 80 percent of metallic or reduced iron therein, the remaining 20% comprising silicious gangue, iron oxide and possibly a small amount of solid carbonaceous material, such as coke. This invention is particularly useful in processing reduced pellets wherein the aforesaid impurities, including unreduced iron oxide, are in the range of 5 percent to 20 percent by weight.

Various types of reducing processes can be used provided they are effective in producing reduced iron pellets of at least about 80 percent pure iron content. A particularly suitable process is that described in said Moklebust patent, in which the pellets are reduced in a rotary kiln having a moving materials bed occupying about 30–50 percent of the kiln volume and containing therein a solid carbonaceous reducing material, such as coke, coke breeze or the like. The temperature is controlled in various areas of the kiln without any appreciable sintering by introducing a counterflow of combustible gas at the discharge end of the kiln and introducing controlled amounts of free oxygen-containing gas, such as atmospheric air, along the path of the combustible gas as it travels toward the inlet or feed end of the kiln, i.e. the end at which the pellets and carbonaceous and other solid materials such as lime, if required, are introduced into the kiln. In a typical installation the kiln can have a length of about 150 feet and an internal diameter between about 6 and 7 feet with an appropriate lining of refractory and thermo-insulating material. Various other operating conditions are described in said Moklebust patent.

Results obtainable with the invention as compared to prior art practices are illustrated by the following example, which, however, is not intended in any way to restrict the scope of the invention. Unless otherwise specifically stated, parts and percentages are given as parts and percentages by weight.

*Example*

Pellets are prepared from a taconite ore concentrated to about 65 percent iron, balance about 7–8% substantially silicious gangue, and having a particle size which will pass through a 300 mesh screen. This material was mixed with bentonite to give a mixture containing 0.5 percent by weight of bentonite, and was pelletized on a standard, slanted rotating disc, into pellets having diameters in the range of ½ to ¾ inch. The pellets were then hardened or indurated by heating at about 2200–2400° F.

These pellets were then reduced in a rotary kiln of the type described in said Moklebust patent using coke as a solid reductant in roughly stoichiometric proportion to the iron content of the ore. The reduced pellets discharged from the kiln at a temperature of about 1900–2000° F., were transferred without exposure to the atmosphere by an enclosed chute to a rotating drum, cooled externally by water in such a manner that the temperature of the pellets is reduced to 350–450° F. over a period of about 5–6 minutes. The pellets, still unexposed to the atmosphere, were then quenched in water to a temperature of about 90° F. The resultant, reduced pellets, contained 89 percent pure iron predominantly of pearlitic structure, and 11 percent impurities, consisting principally of gangue and reduced iron oxide.

The thus-cooled pellets were divided into seven approximately equal portions, and these respectively processed as set forth below for purposes of demonstrating improved properties as briquetted in accordance with this invention without separation of the gangue and other impurities, on the one hand, as compared to removing these impurities prior to briquetting, on the other.

(1) One portion of whole pellets was briquetted dry.
(2) The second portion of whole pellets was briquetted wet.

(3) A third portion of whole pellets was jaw crushed while dry to the following size distribution:

| | Percent |
|---|---|
| +20 | 74.27 |
| −20+40 | 9.02 |
| −40+100 | 5.71 |
| −100+200 | 4.95 |
| −200 | 6.05 |

(4) A fourth portion of whole pellets was similarly jaw crushed while wet to approximately the size of particles of (3).

(5) A fifth portion of the whole pellets was attrition milled dry (one pass) to the following size particles:

| | Percent |
|---|---|
| +20 | 70.00 |
| −20+40 | 12.20 |
| −40+100 | 6.57 |
| −100+200 | 4.93 |
| −200 | 6.00 |

(6) A sixth portion of the whole pellets was attrition milled wet (one pass) to approximately the same size as (5).

(7) The seventh and last portion of the whole pellets was alternately ground and magnetically separated four times and then dried, giving the following particle size distribution:

| | Percent |
|---|---|
| +20 | 0.03 |
| −20+40 | 0.82 |
| −40+100 | 6.42 |
| −100+200 | 11.90 |
| −200 | 80.83 |

The product from each of the above seven portions was briquetted individually using a compacting pressure of 35 tons per square inch, into briquettes of a cylindrical shape 2 inches in diameter and in varying thicknesses, namely 0.2, 0.3, 0.4, 0.5, 0.6, and 0.7 inch respectively.

The various briquettes were then tested by determining the magnitude of the load required to crush each briquette when placed on its edge. The resultant crushing strengths of the respective briquettes are shown in FIG. 1 wherein the five graphs are plotted according to the thicknesses of the briquettes of the various individual types. Graph A shows the greatest strength for the briquettes made from the pellets as dry attrition milled (one pass). Graph B shows the next greatest strength for the jaw crushed pellets, both wet and dry. Graph C shows the next greatest strength for the pellets wet attrition milled (one pass). For a briquette thickness of less than 0.4 inch, the briquettes produced from the wet attrition material showed greater strength than the jaw crushed material, but in greater thicknesses the briquettes produced from this material had a lower strength than the jaw crushed material. Next in order of strength came the briquettes made from the whole pellets, the wet and dry techniques giving approximately the same results.

Surprisingly, as shown in Graph E, the material which had been alternately ground and magnetically separated four times and then dried, resulting in a metallic iron concentrate substantially free of gangue and other impurities, and hence of much greater metallic iron surface area than any of the other samples, exhibited the least strength as compared to any of the whole or partially crushed pellets.

It is obvious from the above example that the resultant strength of briquettes derived from whole pellets or only partially crushed pellets is superior in each case to that obtained from the finely ground and separated metallic iron concentrate.

It will be noted from the FIG. 1 graph, that the crushing strengths of the briquetted whole or crushed pellets are proportionately greater at all briquetted thicknesses than for the briquetted iron concentrate, the strengths of the briquetted whole pellets exceeding those for the iron concentrates by approximately 30% at all briquetted thicknesses, while the strengths of the briquettes formed from the dry attrition ground pellets exceed those for the iron concentrate briquettes by about 65% at all briquetted thicknesses. The increase in briquetted strength obtained by this invention is thus outstanding.

FIG. 2 illustrates the crushing load for briquettes made according to the above example, having a thickness of ½ inch, the order being the same as that indicated in FIG. 1, namely the order of decreasing strength is:

A—dry attrition milled product.
B—wet jaw crushed.
B'—dry jaw crushed.
C—wet attrition milled.
D—whole pellets dry.
D'—whole pellets wet.
E—finely divided and magnetically separated product.

Briquettes made according to the practice of this invention can vary in size but advantageously have the smallest dimension no less than about ⅛ inch, preferably no less than ½ inch, and the largest dimension no larger than about 5 inches. The pressures used in making these briquettes are those normally used for such purposes and advantageously should be no less than about 30 tons, preferably no less than 35 tons, per square inch. These briquettes can be used in cupola, electric, or other melting furnaces adapted for the removal of slag.

It has been found also that briquettes made according to the practice of this invention can stand exposure to various types of weather conditions, including intermittent rain, and/or snow, and sunshine, without loss of strength.

Referring to FIG. 1 it will be observed that briquettes according to this invention having a diameter of two inches and a thickness of one half inch and thus containing about one and one half cubic inches of volume, have a crushing strength in excess of 1500 pounds.

What is claimed is:

1. The method of processing oxidic iron ores and other iron oxide-containing materials of substantial gangue and other impurity content, into high strength briquettes containing said impurities, which comprises: forming said material into pellets, subjecting said pellets to elevated temperature induration and reduction without fusion in the presence of a reducing agent until at least 80% by weight of the iron values thereof have been metallized, and without separation of the impurities including unreduced iron oxide from the metallic iron values of the indurated and reduced pellets, compacting them into briquettes of substantially larger dimensions.

2. The method of processing oxidic iron ores and other iron oxide-containing materials of substantial gangue and other impurity content, into high strength briquettes containing said impurities, which comprises: forming said material into pellets of about ⅛ and 1 inch in diameter, subjecting said pellets to elevated temperature induration and reduction without fusion in the presence of a reducing agent until at least 80% by weight of the iron values have been metallized and the impurity content including unreduced iron oxide, is within the range of about 5–20%, and without separation of the impurities from the metallic iron values, of the indurated and reduced pellets, compacting them into briquettes of substantially larger dimensions under pressure of at least 30 tons per square inch.

3. The method of processing oxidic iron ores and other iron oxide-bearing materials, containing at least 5% of gangue and other impurities, into high strength briquettes containing said impurities, which comprises: forming said material into pellets and subjecting said pellets to elevated temperature reduction and induration without fusion in the presence of a comminuted solid carbonaceous reducing agent of maximum dimensions substantially less than said pellets, and until at least 80% by weight of the iron values have been metallized and the impurity including unreduced iron oxide content of said pellets is within the range of about 5–20%, thereupon separating the excess carbonaceous reductant from said pellets, and without separation of said impurities from the metallic iron values of said pellets, compacting said pellets into briquettes of substantially greater dimensions under pressure of at least 30 tons per square inch.

4. The method of processing oxidic iron ores and other iron oxide-containing materials of substantial gangue content into high strength briquettes containing said gangue, which comprises: forming said material into pellets of about ⅛ to 1 inch in diameter, hardening said pellets by heating, subjecting said hardened pellets to elevated temperature, rotary kiln reduction without fusion in the presence of a solid carbonaceous reducing agent of a particle size less than said pellets, until at least 80% by weight of the iron values have been metallized, separating any excess carbonaceous reductant from the residue, and without separation of the gangue and other impurities present including unreduced iron oxide, from the metallic iron values of the reduced ore product, compacting said product into briquettes.

References Cited by the Examiner
UNITED STATES PATENTS

| | | | |
|---|---|---|---|
| 2,287,663 | 6/1942 | Brassert | 75—3 |
| 2,864,686 | 12/1958 | Agarwal | 75—3 |
| 2,986,460 | 5/1961 | Babcock et al. | 75—44 |
| 3,093,474 | 6/1963 | Collin | 75—33 |

BENJAMIN HENKIN, *Primary Examiner.*

DAVID L. RECK, *Examiner.*